United States Patent [19]

Nakazato et al.

[11] Patent Number: 5,010,784
[45] Date of Patent: Apr. 30, 1991

[54] ELECTRICAL CONNECTING DEVICE FOR A STEERING WHEEL OF A MOTOR VEHICLE

[75] Inventors: Wataru Nakazato, Gunma; Akira Takase, Oota, both of Japan

[73] Assignee: Fuji Jukogyo Kabushiki Kaisha, Tokyo, Japan

[21] Appl. No.: 321,368

[22] Filed: Mar. 9, 1989

[30] Foreign Application Priority Data

Mar. 14, 1988 [JP] Japan ............... 63-034335[U]

[51] Int. Cl.⁵ .............. H01R 39/02; G05G 1/08; G05G 5/04
[52] U.S. Cl. ...................... 74/498; 439/15; 116/31; 116/DIG. 21; 74/492
[58] Field of Search ............ 280/779, 89, 731; 180/78, 79; 74/10.2, 498, 526; 439/15, 245, 840, 841; 174/86; 116/DIG. 21, 31; 200/61.54

[56] References Cited

U.S. PATENT DOCUMENTS

| | | | |
|---|---|---|---|
| 1,364,243 | 1/1921 | Caldwell | 74/498 |
| 2,845,893 | 8/1958 | Eshbaugh et al. | 116/31 |
| 3,372,668 | 3/1968 | Chambers | 116/31 |
| 3,525,536 | 8/1970 | Pruneski | 439/15 |
| 3,662,610 | 5/1972 | Thoen | 74/526 |
| 4,502,746 | 3/1985 | Wawra et al. | 439/15 |
| 4,604,912 | 8/1986 | Sugita et al. | 200/61.54 |

FOREIGN PATENT DOCUMENTS 62-238164 10/1987 Japan .

Primary Examiner—Charles A. Marmor
Assistant Examiner—Karin Tyson
Attorney, Agent, or Firm—Martin A. Farber

[57] ABSTRACT

An electrical connecting device for an air bag of a motor vehicle is disclosed. An inner cylinder is secured to a steering wheel, and an outer cylinder is secured to a steering column for the steering wheel. A flexible helical stirp is disposed between the inner and outer cylinder. A sun gear is formed on an outer periphery of the inner cylinder, a ring gear is formed on a side of the outer cylinder, and planet pinion is engaged with the sun gear and the ring gear. A stopper is provided for stopping the planet pinion at revolution ends thereof, and a mark provided at a neutral position diametrically opposite to the stopper.

6 Claims, 3 Drawing Sheets

& # x20;# ELECTRICAL CONNECTING DEVICE FOR A STEERING WHEEL OF A MOTOR VEHICLE

BACKGROUND OF THE INVENTION

The present invention relates to an electrical connecting device equipped in a steering column of a motor vehicle for electrically connecting an electric device mounted on the vehicle with an electric device mounted on a steering wheel.

An electrical connecting device for connecting an electric device mounted on a moving part with an electric device mounted on a stationary part usually employs a slip ring device. The slip ring operates to connect sliding contacts to keep electrical connection, and hence the connection may be influenced by dust and wetness, and/or vibration of the motor vehicle.

Accordingly, in recent years, the connecting device for an electric equipment which requires a particular reliability, such as an operating device for an air bag, uses a spiral flexible strip as disclosed in U.S. Pat. 3,525,536.

The electrical connecting device employed with the spiral flexible metal strip comprises an inner anchor ring secured to a steering shaft for a steering wheel to be rotated with the steering wheel and an outer anchor ring secured to a housing of a steering column. The flexible strip is loosely coiled in a spiral between the inner and outer anchor rings. An inner end portion of the flexible strip is electrically connected to the inner anchor ring and an outer end portion is electrically connected to the outer anchor ring. Upon rotation of the steering wheel, the slack in the loosely wound strip is either decreased or increased, depending on the direction of rotation of the steering wheel. If the inner ring is rotated with the steering wheel in excess of a permissible rotation angle with respect to the outer ring, an excessive load is exerted on the spiral flexible strip, which may cause the strip to break.

In order to resolve such a problem, the connecting device is attached to the steering wheel at a neutral position of the steering wheel where the inner ring is rotatable approximately by the same maximum angles in both the clockwise direction and the counterclockwise direction. To attach the connecting device at such a neutral position, the inner ring must be previously set to the neutral position of the steering wheel.

Heretofore, the inner ring is rotated to a maximum limit position in a direction and then returned a predetermined rotation in the opposite direction, so that the inner ring may set at a position near the neutral position. However, this manner lacks accuracy and the operation is troublesome.

Japanese Patent application Laid-Open No. 62-238164 discloses a neutral position indicating device for accurately positioning the inner ring at a neutral position. However, the neutral position indicating device comprises a number of parts. In addition, excessive load exerted on the flexible strip cannot be prevented.

SUMMARY OF THE INVENTION

The object of the present invention is to provide an electrical connecting device which indicates a neutral position through simple means and prevents excessive load from being exerted on a flexible strip.

According to the present invention, there is provided an electrical connecting device for a steering wheel of a motor vehicle comprising, an inner cylinder secured to the steering wheel, an outer cylinder secured to a steering column for the steering wheel, a flexible helical strip disposed between the inner and outer cylinders, both ends of which are secured to the cylinders, respectively, a planetary gear device having sun gear formed on an outer periphery of the inner cylinder, a ring gear formed on an outer periphery of the outer cylinder, and a planet pinion engaged with the sun gear and the ring gear, a stopper provided for stopping the planet pinion at revolution ends thereof, and marking means provided at a neutral position diametrically opposite to the stopper.

The other objects and features of this invention will become understood from the following description with reference to the accompanying drawings.

DETAILED DESCRIPTION OF THE PREFERRED EMBODIMENT

Figures 4, 4A:
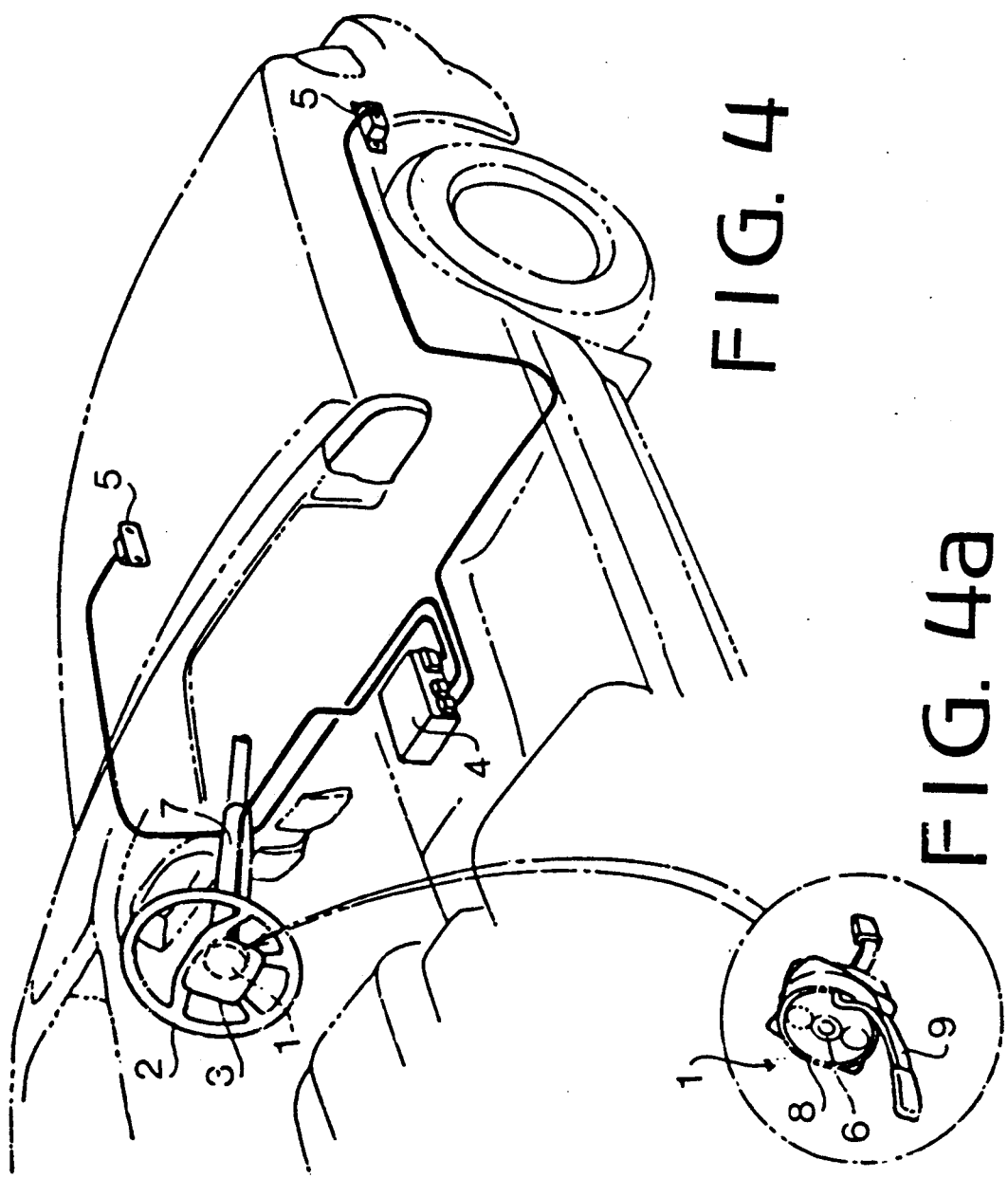
FIG. 4 is a perspective view showing a part of a motor vehicle provided with an air bag system.
FIG. 4a is a perspective view of the electrical connecting device.

Referring to FIG. 4, an air bag 3 is mounted on a steering wheel 2 of a motor vehicle. An electrical connecting device 1 is provided for electrically connecting an inflator for the air bag 3 to a control unit 4 mounted in the motor vehicle. A plurality of sensors 5 are connected to the control unit 4 for sensing shock at collision of the motor vehicle.

Figure 1:
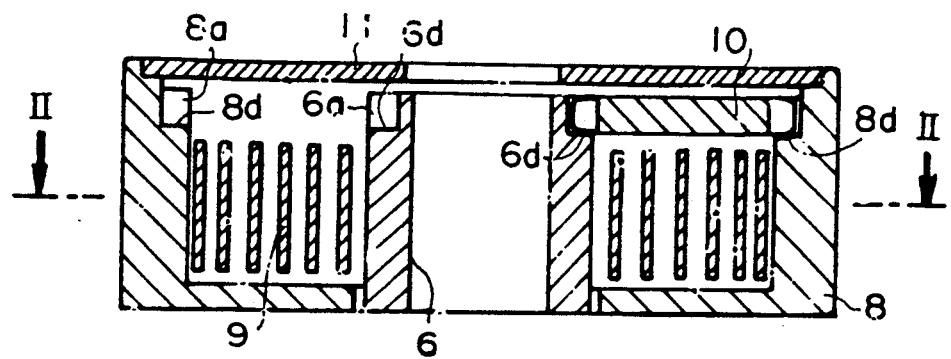
FIG. 1 is a sectional side view showing an electrical device for a steering wheel of a motor vehicle according to the present invention.
Figure 2:
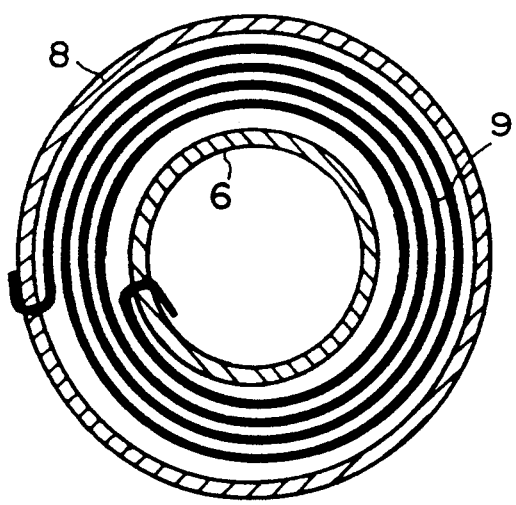
FIG. 2 is a sectional view of the connecting device taken along a line II—II of FIG. 1.
Figure 5:
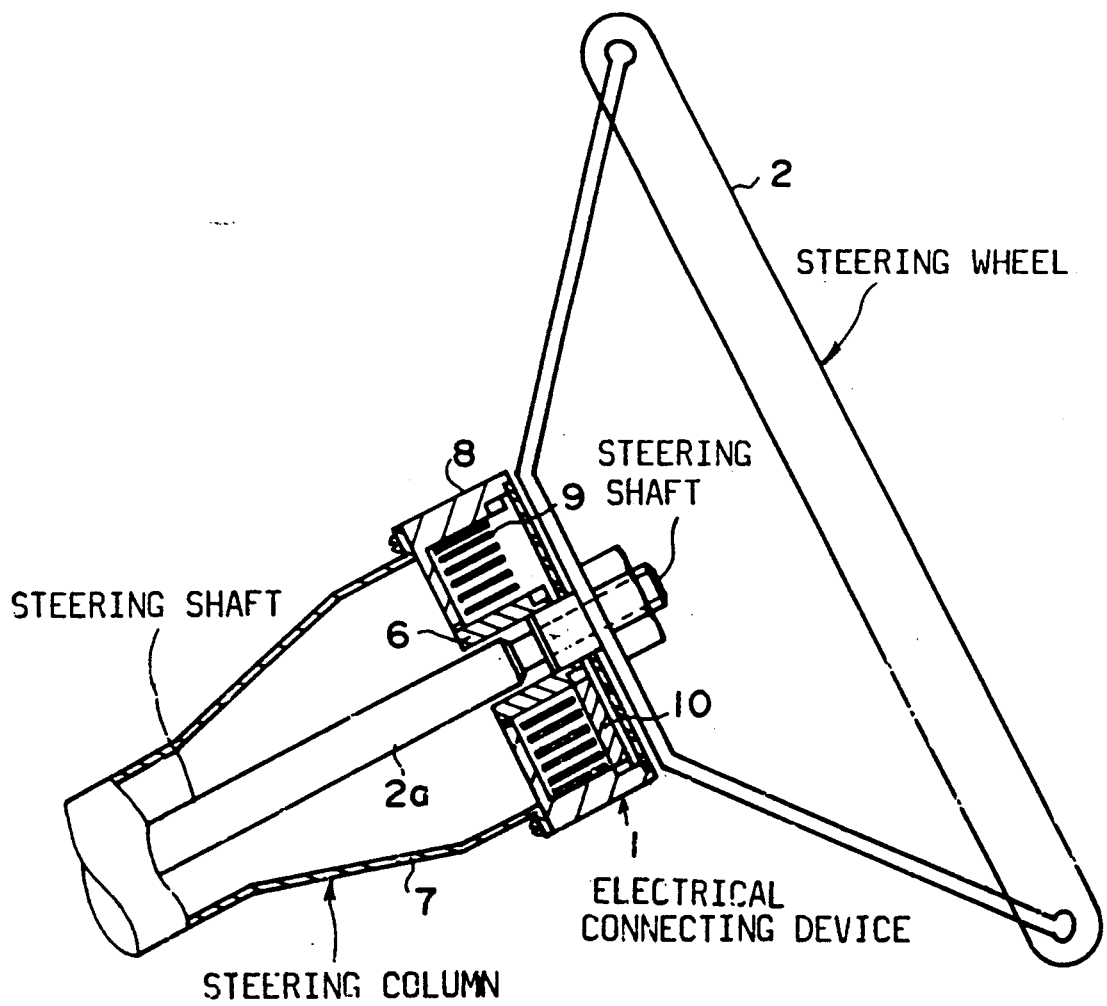
FIG. 5 is a sectional view showing an inside of a steering column.

Referring to FIGS. 1, 2 and 5, the electrical connecting device 1 comprises an inner cylinder 6 secured to a steering shaft 2a and an outer cylinder 8 secured to a steering column 7 (FIG. 4). A flexible metal strip 9 is disposed between the inner and outer cylinders 6 and 8 and coiled in a spiral. An inner end of the strip 9 is secured to the inner cylinder 6 and an outer end is secured to the outer cylinder 8.

Figure 3:
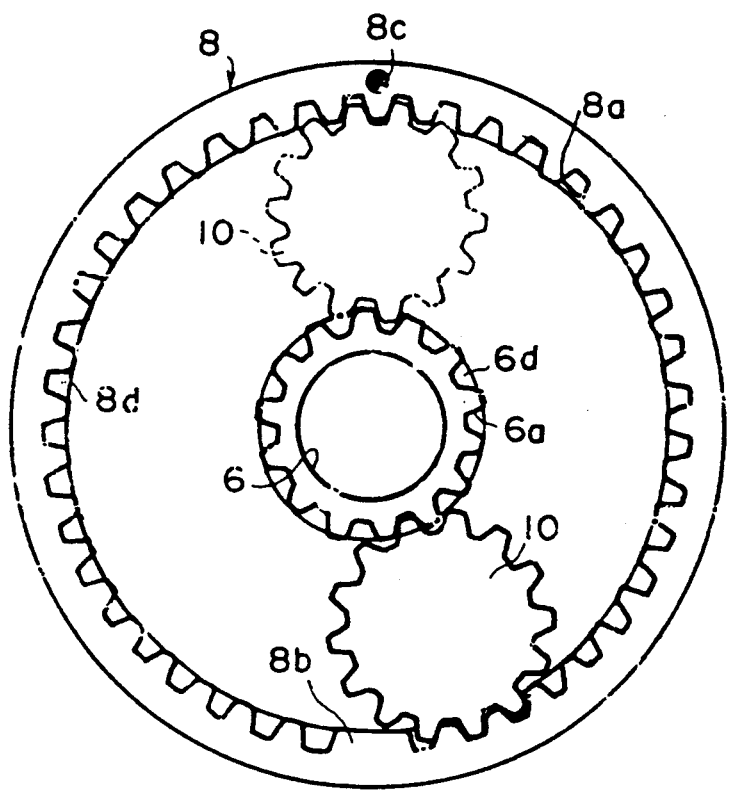
FIG. 3 is a plan view of the device of FIG. 1.

Referring to FIG. 3, a planetary gear device is provided in the electrical connecting device 1. The inner cylinder 6 made of plastic has an external sun gear 6a integrally formed on an outer periphery of an upper end portion (FIG. 1) thereof. The outer cylinder 8 made of plastic has an internal ring gear 8a integrally formed on an inner periphery of an upper portion thereof corresponding to the sun gear 6a. A planet pinion 10 having the same number of teeth as the sun gear 6a is provided meshing with the sun gear 6a and the ring gear 8a. Each the sun gear 6a and the ring gear 8a is formed in the upper end portion of the cylinder, such that a plurality of shelves 6d, 8d are formed in the cylinders 6 and 8 respectively. Some of the gear teeth of the planet pinion 10 are supported on the shelves 6d and 8d in every position of the planet pinion (FIGS. 1 and 3). Thus, the pinion 10 is supported without a separate carrier. A transparent ring cover 11 is secured to the outer cylinder 8 as shown in FIG. 1. Thus, the planet pinion 10 is prevented from being removed. Thus, when the inner cylinder 6 is rotated, the planet pinion 10 revolves about the sun gear 6a. At right and left revolution ends, a stopper 8b consisting of two teeth of the ring gear 8a is formed for stopping the planet pinion 10. A marking 8c is provided on the ring gear 8a diametrically opposite to the stopper 8b, that is at a neutral straight-ahead position. The number of allowed rotations of the sun gear 6a relative to the outer cylinder 8 were the inner cylinder 6 not connected to the steering wheel, is set to a slightly larger value than the allowed number of rotations of the steering wheel 2, that is locking to locking of the steering wheel.

For example, when the steering wheel 2 can be rotated three times, the sun gear 6a can be rotated four times. In that case, the gear ratio of the sun gear 6a to the ring gear a is set to 1:4. Thus, when the inner cylinder 6 rotates four times, the planet pinion 10 revolves one time around the inner cylinder 6. The positioning of the inner cylinder 6 to the neutral position is easily and accurately performed by positioning the planet pinion at the marking 8c, looking at the pinion 10 through the transparent cover 11.

The connecting device 1 set to the neutral position is attached to the steering wheel 2 in such a manner that the outer cylinder 8 is secured to the steering column 7 and the inner cylinder 6 is secured to the steering shaft at the straight-ahead position of the steering wheel 2. If the connecting device 1 is attached to the steering wheel 2 at a position deviating from the straight-ahead position, the steering wheel is set at a position from which the steering wheel is allowed to be rotated beyond the allowable two times of the inner cylinder 6 in the opposite direction. However, the planetary gear device operates to limit the rotation of the inner cylinder 6 within the allowable range. Namely, the revolution of the planet pinion 10 is prevented by the stopper 8b from rotating beyond the range. Thus, excessive load is not exerted on the spiral flexible strip 9, thereby preventing the strip from breaking.

In the present invention, the inner cylinder can be accurately positioned at the neutral position indicated by a simple structure comprising a mark and a planet pinion. Further, when the inner cylinder reaches a rotational end, it is stopped by a stopper. Thus, excessive load is exerted on the flexible strip.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An electrical connecting device for a steering wheel of a motor vehicle comprising:
    an inner cylinder secured to the steering wheel;
    an outer cylinder secured to a steering column for the steering wheel;
    a flexible helical strip disposed between the inner and outer cylinders, said strip having one end connected to the inner cylinder and an opposite end connected to the outer cylinder;
    a planetary gear device having a sun gear formed on an outer periphery of the inner cylinder, a ring gear formed on an inner periphery of the outer cylinder, and a planet pinion engaged with the sun gear and the ring gear; and
    a stopper provided on a periphery of the ring gear for stopping a planet pinion at revolution ends thereof; and
    said inner and outer cylinders being formed with shelves adjacent a bottom of said sun gear and said ring gear; and
    said planet pinion being supported by teeth of said planet meshing with said sun and ring gears resting on said shelves.

2. The electrical connecting device according to claim 1, wherein
    the number of allowed rotations of the sun gear is set to a value larger than the number of allowed rotations of the steering wheel, independently of a connection of the sun gear and the steering wheel.

3. The electrical connecting device according to claim 1, further comprising
    a transparent covering the planetary gear device.

4. An electrical connecting device for a steering wheel of a motor vehicle comprising:
    an inner cylinder secured to the steering wheel;
    an outer cylinder secured to a steering column for the steering wheel;
    a flexible helical strip disposed between the inner and outer cylinders, said strip having one end connected to the inner cylinder and an opposite end connected to the outer cylinder;
    a planetary gear device having a sun gear formed on an outer periphery of the inner cylinder, a ring gear formed on an inner periphery of the outer cylinder, and a planet pinion engaged with the sun gear and the ring gear;
    a stopper provided on a periphery of the ring gear for stopping the planet pinion at revolution ends thereof; and
    marking means provided on an upper end face of the outer cylinder at a neutral position diametrically opposite to the stopper for representing a neutral position at coincidence of the planet pinion therewith, whereby the inner cylinder is set at the neutral position in accordance with the marking means;
    said inner and outer cylinders being formed with shelves adjacent a bottom of said sun gear and said ring gear; and
    said planet pinion being supported by teeth of said planet meshing with said sun and ring gears resting on said shelves.

5. The electrical connecting device according to claim 4, wherein
    said steering wheel is connectable to said inner cylinder such that at said neutral position of said planet pinion at coincidence with said marking means said steering wheel is substantially at its neutral position of straight-ahead driving and said outer cylinder is connectable to a steering column for there steering wheel.

6. The electrical connecting device according to claim 5, wherein
    the number of allowed rotations of the sun gear is set to a value larger than the number of allowed rotations of the steering wheel, considered independently of connection of the sun gear with the steering wheel.

* * * * *